United States Patent
Griffin et al.

(10) Patent No.: US 9,323,829 B2
(45) Date of Patent: Apr. 26, 2016

(54) IDENTIFICATION OF CONCEPTS AND ASSOCIATED PROCESSING

(71) Applicants: Thomas Patrick Griffin, Piscataway, NJ (US); Alexander J. Pasik, New York, NY (US)

(72) Inventors: Thomas Patrick Griffin, Piscataway, NJ (US); Alexander J. Pasik, New York, NY (US)

(73) Assignee: The Institute of Electrical and Electronics Engineers, Incorporated, New York, NY (US)

( * ) Notice: Subject to any disclaimer, the term of this patent is extended or adjusted under 35 U.S.C. 154(b) by 198 days.

(21) Appl. No.: 13/801,068

(22) Filed: Mar. 13, 2013

(65) Prior Publication Data

US 2014/0280043 A1    Sep. 18, 2014

(51) Int. Cl.
*G06F 17/30* (2006.01)

(52) U.S. Cl.
CPC ...... *G06F 17/3064* (2013.01); *G06F 17/30696* (2013.01); *G06F 17/30855* (2013.01); *G06F 17/30864* (2013.01)

(58) Field of Classification Search
None
See application file for complete search history.

(56) References Cited

U.S. PATENT DOCUMENTS

| | | |
|---|---|---|
| 7,257,585 B2 | 8/2007 | Stevenson et al. |
| 7,617,121 B1 | 11/2009 | DeMayo et al. |
| 7,698,311 B2 | 4/2010 | Stevenson et al. |
| 7,788,245 B1 | 8/2010 | Eddings et al. |
| 7,853,558 B2 | 12/2010 | Brindley |
| 7,860,342 B2 | 12/2010 | Levien et al. |
| 7,912,868 B2 | 3/2011 | Calistri-Yeh et al. |
| 7,962,465 B2 | 6/2011 | Kraft et al. |
| 8,051,080 B2 | 11/2011 | Kraft et al. |
| 8,122,014 B2 | 2/2012 | Brindley et al. |
| 8,126,190 B2 | 2/2012 | Jung et al. |
| 8,131,767 B2 | 3/2012 | Brindley |
| 8,203,609 B2 | 6/2012 | Jung et al. |
| 8,352,321 B2 | 1/2013 | Mei et al. |

(Continued)

OTHER PUBLICATIONS

Ma et al. "Interest-based personalized search" ACM transactions on information system Feb. 2007; vol. 25, No. 1 Article 5, pp. 1-38.*

(Continued)

*Primary Examiner* — Robert Beausoliel, Jr.
*Assistant Examiner* — Pedro J Santos
(74) *Attorney, Agent, or Firm* — Kenyon & Kenyon LLP

(57) ABSTRACT

Relevant content from target content may be identified. The relevant content may be matched against a concept graph. The concept graph may include one or more concepts and associations between the concepts. Concepts may be determined based on the matching. The relevant content may be augmented with indicators to indicate the determined concepts. The determined concepts may be searched in one or more search spaces to obtain search results. Access may be granted to information indicated by the search results.

16 Claims, 15 Drawing Sheets

(56) References Cited

U.S. PATENT DOCUMENTS

| | | | |
|---|---|---|---|
| 2006/0122884 | A1 | 6/2006 | Graham et al. |
| 2009/0327205 | A1 | 12/2009 | Sweeney |
| 2011/0035438 | A1 | 2/2011 | Henkin et al. |
| 2011/0113032 | A1 | 5/2011 | Boscolo et al. |
| 2011/0179032 | A1 | 7/2011 | Ceusters et al. |
| 2012/0054440 | A1* | 3/2012 | Doig et al. ............ 711/122 |
| 2012/0102050 | A1* | 4/2012 | Button et al. ........... 707/749 |
| 2012/0110015 | A1* | 5/2012 | Nath et al. ............. 707/780 |
| 2012/0290407 | A1* | 11/2012 | Hubbard et al. ........ 705/14.72 |
| 2013/0173727 | A1 | 7/2013 | Libin et al. |

OTHER PUBLICATIONS

"How to Add Amazon.com Contextual Links to a Site—You Tube", uploaded Jul. 26, 2011, URL: https://www.youtube.com/watch?v=AT6LdEm1rW0, screen shots included from viewing on Jul. 11, 2013.

"Contextual | Amazon.com Associates Central—Widgets", URL: https://widgets.amazon.com/?category=Contextual, screen shot pulled on Jul. 11, 2013.

Evernote Unveils Evernote Context, An AI Play That Surfaces Content From Outside Sources As You Write: http://techcrunch.com/2014/10/02/evernote-unveils-evernote-context-an-ai-play-that-surfaces-content-from-ouside-sources-as-you-write/, accessed on Oct. 20, 2014.

International Search Report and Written Opinion dated Oct. 1, 2014 of PCT/US2014/023224 filed Mar. 11, 2014.

* cited by examiner

100

200

300

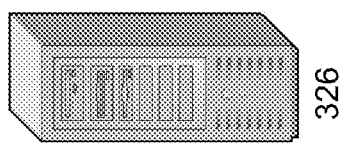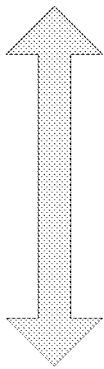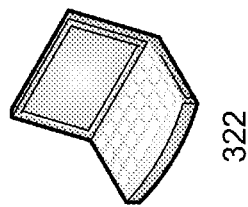
FIG. 3A
320

500

600

A computer science education is now offered at the University. —702

The computer library is equipped with state of the art hardware —706
—704 and software. —708

A computer science education is now offered at the University.
— 1102

The computer library is required with state of the art hardware

| Replace with optimal phrase |
| Replace all with optimal phrase |
| Function 3 |
| Function 4 |
| Function 5 |
| . . . 1110 | and software.

IDENTIFICATION OF CONCEPTS AND ASSOCIATED PROCESSING

BACKGROUND

When a user accesses the contents of target content such as a document, the user may notice concepts such as phrases (i.e., one or more words) in the document which relate to a topic of interest to the user. The user may then copy these phrases and perform a search utilizing the copied phrases as search terms. The above process is inefficient because the user has to manually perform the searches and the user may not know whether the phrases found on the webpage are optimal search terms. Furthermore, the above process does not provide the user with a seamless computer experience since the user has to either navigate away from the document at hand or open a new browser window to perform additional searches.

BRIEF DESCRIPTION OF THE DRAWINGS

FIG. 3A shows an exemplary architecture in an embodiment.

FIG. 7 illustrates a modified document according to an embodiment.

FIG. 11 illustrates a modified document indicating phrases of interest and processes associated with the phrases according to an embodiment.

DETAILED DESCRIPTION OF EXAMPLE EMBODIMENTS

Figure 1:
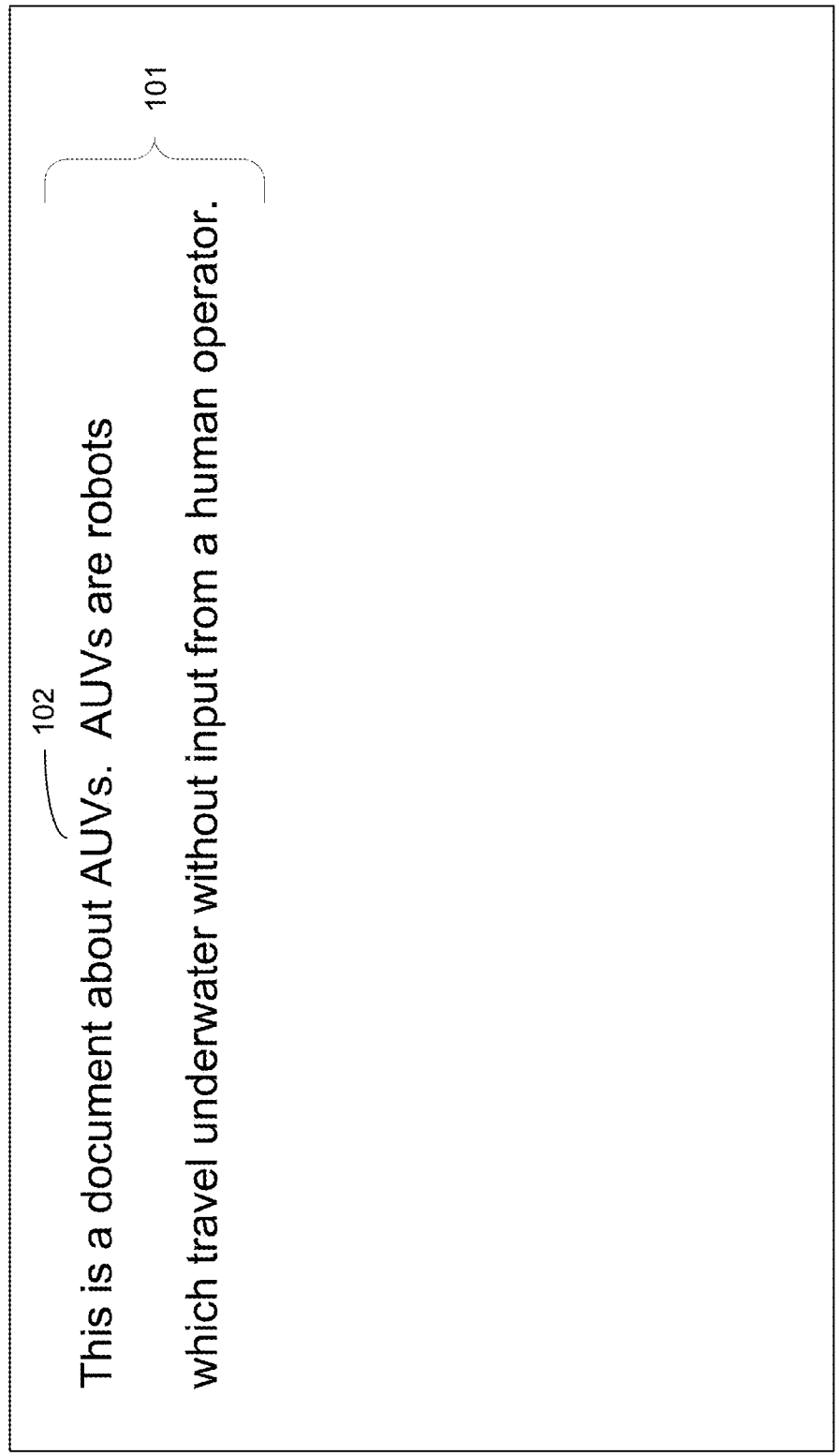
FIG. 1 illustrates a conventional exemplary document.

In accordance with example embodiments of the present invention, systems and methods are disclosed which identify phrases and provide functionality associated with the identified phrases. In an embodiment, relevant content from target content may be identified. The relevant content may be matched against a concept graph. The concept graph may include one or more concepts and associations between the concepts. Concepts may be determined based on the matching. The relevant content may be augmented with indicators to indicate the determined concepts. The determined concepts may be searched in one or more search spaces to obtain search results. Access may be granted to information indicated by the search results.

In an embodiment, a request may be sent. The request may include a text segment of a document. A response may be received. The response may indicate phrases of interest in the text segment based on a reference. The reference may include one or more phrases and associations between the phrases. The document may be displayed with visual properties identifying the phrases of interest. In response to user input corresponding to a phrase of interest, another request may be sent to retrieve information associated with the phrase of interest from a data source.

In an embodiment, a request may be sent. The request may include a text segment of a document. A response may be received. The response may indicate phrases of interest in the text segment based on a reference. The reference may include one or more phrases and associations between the phrases. The document may be displayed with visual properties identifying the phrases of interest. In response to a user input corresponding to a phrase of interest, an interface with an optimal phrase to replace the phrase of interest may be displayed. In response to another user input, the phrase of interest may be replaced with the optimal phrase.

In an embodiment, a request from a user device may be received. The request may include a text segment of a document. Phrases of interest may be determined in the text segment based on a reference. The reference may include one or more phrases and associations between the phrases. The phrases of interest may be indicated in a response to the user device. The response may be transmitted to the user device. The response may enable the user device to display the document, visually identify the phrases of interest indicated in the response within the document, and in response to user input corresponding to a phrase of interest within the document, send a request to retrieve information associated with the phrase of interest from a data source.

In an embodiment, a request may be received from a user device. The request may be generated in response to user input associated with an indicated phrase of interest within a displayed document. The phrase of interest may be determined based a reference. The reference may include one or more phrases and associations between the phrases. The request may include the phrase of interest. Search results associated with the phrase of interest may be retrieved. A response may be transmitted to the user device with the search results. The response may enable the user device to display the search results.

In an embodiment, a request may be received from a user device for a document. The document may be retrieved. A text segment of the document may be identified. Phrases of interest in the text segment may be determined based on a reference. The reference may include one or more phrases and associations between the phrases. The phrases of interest may be indicated in a response to the user device. The response may be transmitted to the user device. The response may enable the user device to display the document, visually identify the phrases of interest indicated in the response within the document, and in response to user input corresponding to a phrase of interest within the document, display search results corresponding to the phrase of interest.

FIG. 1 illustrates a conventional exemplary document 100 displayed to a user via a user device such as a computer. Document 100 may be a webpage document. The webpage 100 may include text 101 related to one or more topics of interest to the user. While reading the text 101, the user may want to explore one or more phrases in the text 101. For example, the user may want more information about the phrase 102, "AUVs." Therefore, using conventional methods, the user may navigate away from the current webpage or open a new browser window and use a search engine to manually perform a search using the search term, "AUVs." The above process is inefficient because the user has to manually perform the searches and the user may not know whether the phrases found on the webpage are optimal search terms. Furthermore, the above process does not provide the user with a seamless computer experience since the user has to either navigate away from the document at hand or open a new browser window to perform additional searches.

Figure 2:
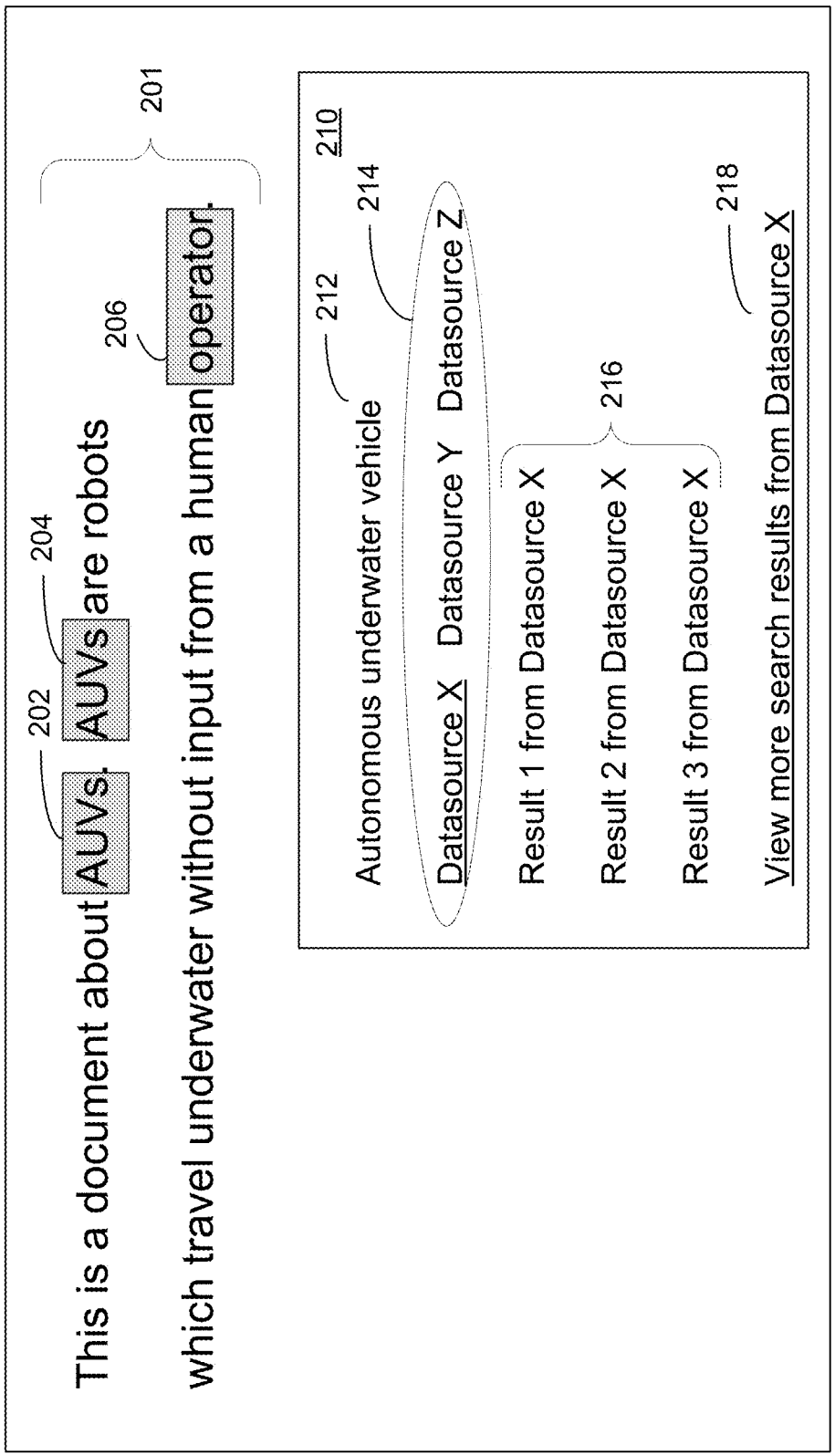
FIG. 2 illustrates an exemplary document displayed to a user according to an embodiment.

In accordance with an example embodiment of the present invention, a user at a user device (e.g., a device having a processor, a display, and an input device) may request a webpage document. FIG. 2 illustrates an exemplary document 200 which may be displayed to a user in response to the request. The webpage 200 may include text 201 related to one or more topics of interest to the user. One or more phrases such as 202, 204, and 206, in the text 201 may include visual properties that distinguish them from the rest of the content in text 201. For example, phrases 202, 204, and 206 may be highlighted or italicized. The visual properties may convey to the user that one or more user actions may be performed on phrases 202, 204, and 206, and that the one or more user actions may trigger one or more functions. For example, hovering a cursor over the phrase 202, "AUVs," may trigger the display of a dialog box 210. Dialog box 210 may present information associated with AUVs such as results 216 from searches conducted in one or more data sources which store information pertaining to AUVs; links 214 to the data sources may also be displayed to in dialog box 210. Thus, multiple data sources are searched at once. In an embodiment, the information stored in the data sources may be curated by the owner of the data. Furthermore, the user does not need to manually perform a search by navigating away from the webpage 200 or opening a new browser window. In addition, the searches conducted in data sources may return optimized results. For instance, instead of using the acronym, "AUVs," to conduct the search, the expanded search term, "autonomous underwater vehicle," 212 (i.e., an optimal phrase) may be used. Therefore the user may receive search results which are more relevant to the topic of interest.

In an embodiment, user input such as clicking on any one of the links 214 to data sources—data source X, data source Y, or data source Z—may display the search results from the respective data source in dialog box 210. This further reduces the need for the user to manually perform searches on multiple data sources to find information relevant to AUVs. In an embodiment, additional results may be displayed to the user on a new browser window in response to user input such as double-clicking on links 214 to one of the data sources. In an alternate embodiment, the additional search results from data source X may be displayed to the user on a new browser window in response to user input such as clicking on link 218 which may include a description such as "view more search results from data source X."

Figure 3:
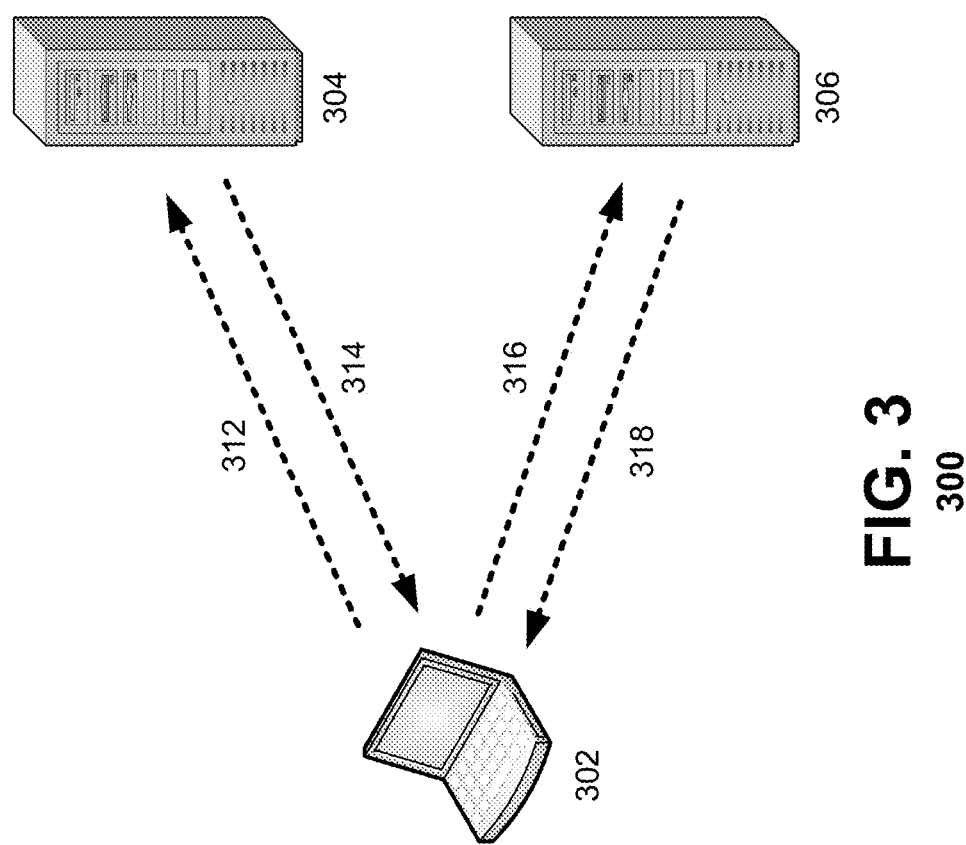
FIG. 3 shows an exemplary architecture in an embodiment.

FIG. 3 shows an exemplary architecture 300 in an embodiment of the present invention. User device 302 may send a request 312 for a document such as a webpage to a webserver 304 via, e.g., a browser. In response, the webserver 304 may send the requested webpage 314 to the user device 302. Prior to displaying the requested webpage or, in parallel, while displaying all or a portion of the webpage, the user device 302 may then send all or a selected portion of the webpage (e.g., a text segment from the webpage) 316 to an application server 306. In response, the application server 306 may return information to modify/augment the webpage 318 to the user device 302. The user device 302 may modify the webpage based on the information sent from server 306 and display the modified webpage. In another embodiment, the user device may display the webpage prior to receiving the information to modify/augment the webpage, and then replace the displayed webpage with the modified webpage. In one example embodiment, the information to modify/augment the webpage 318 may be an entire webpage replacement which includes modified information.

The information sent from server 306 to user device 302 may indicate phrases of interest in the webpage. The phrases of interest may be determined by the server 306 as explained in the discussion pertaining to FIG. 4 below. In a further embodiment, the information sent from server 306 may include additional information pertaining to the phrases of interest such as search results from one or more data sources as explained in the discussion pertaining to FIG. 10. The information sent from servers 304 and/or 306 may include any programming code and/or markup language necessary to modify the webpage including but not limited to JavaScript, HyperText Markup Language (HTML), Extensible Markup Language (XML), Asynchronous JavaScript (Ajax), jQuery, Java Server Pages (JSP), Apache Velocity, FreeMarker, Java HTML (JHTML), Thymeleaf, Adobe ColdFusion, and/or any code which may be processed by an application or application plug-in installed on the user device 302.

In an embodiment, the information sent from server 306 to user device 302 may be processed directly by an application displaying/processing the webpage on user device 302 such as a web browser. In another embodiment the information sent from server 306 to user device 302 may be processed by a plug-in of an application installed on the user device 302 such as a plug-in for a web browser.

In an illustrative example, a web browser may be running on user device 302. A user may request 312 a webpage A from server 304 using the web browser. The server 304 may return 314 the requested webpage A along with embedded Javascript in the webpage A. Upon receiving the response 314 from server 304, the web browser on user device 302 may load the webpage and the embedded Javascript may be executed. The embedded Javascript may include instructions to 1) select all or a portion of the content on webpage A and 2) send a request to server 306 with the selected content for identifying phrases of interest in the content. As a result, the web browser may send a request with the selected content 316 to server 306. In response, the server 306 may process the content from webpage A to identify the phrases of interest based on a reference (as explained in the discussion pertaining to FIG. 4 below). The server 306 may send a response 318 to the web browser on user device 302 indicating the phrases of interest. HTML tags may be used to identify the phrases of interest in the response 318. The web browser on user device 302 may display the webpage A with the phrases of interest visually identified to the user (as explained in the discussion pertaining to FIG. 7 below). The Javascript, originally sent by server 304, may include additional instructions to send another request to a server 306 for retrieving information from one or more data sources pertaining to a visually identified phrase of interest on webpage A in response to user input such as hovering a cursor over the phrase of interest. Therefore, in response to hovering a cursor over the phrase of interest, a request may be sent to server 306 with the phrase of interest. The server 306 may retrieve information pertaining to the phrase of interest indicated in the request from one or more data sources and/or a cache and may return the search results to the web browser on user device 302 (as explained in the discussion pertaining to FIG. 10 below). Upon receiving the response from server 306, the Javascript may instruct the web browser to display the search results in an interface such as a dialog box (as explained in the discussion pertaining to FIG. 8 below).

In another illustrative example, a web browser may be running on user device 302. A user may request 312 a webpage A from server 304 using the web browser. The server 304 may return 314 the requested webpage A along with embedded Javascript in the webpage A. Upon receiving the response 314 from server 304, the web browser on user device 302 may load the webpage and the embedded Javascript may be executed. The embedded Javascript may include instructions to 1) select all or a portion of the content on webpage A and 2) send a request to server 306 with the selected content for identifying phrases of interest in the content and for retrieving information pertaining to the identified phrases of interest. As a result, the web browser may send a request with the selected content 316 to server 306. In response, the server 306 may process the content from webpage A to 1) identify the phrases of interest based on a reference (as explained in the discussion pertaining to FIG. 4 below) and 2) retrieve information pertaining to the identified phrases of interest from one or more data sources and/or a cache (as explained in the discussion pertaining to FIG. 10 below). The server 306 may send a response 318 to the web browser on user device 302 including the phrases of interest and search results pertaining to the phrases of interest. HTML tags may be used to identify the phrases of interest and the search results in the response 318. The web browser on user device 302 may display the webpage A with the phrases of interest visually identified to the user (as explained in the discussion pertaining to FIG. 7 below). The Javascript, originally sent by server 304, may include additional instructions to display the search results corresponding to a visually identified phrase of interest on webpage A in response to user input such as hovering a cursor over the phrase of interest. Therefore, in response to hovering a cursor over the phrase of interest, the search results corresponding to the phrase of interest may be displayed in an interface such as a dialog box (as explained in the discussion pertaining to FIG. 8 below).

In another illustrative example, a web browser may be running on user device 302. The web browser may include an installed plug-in to process webpages. A user may request 312 a webpage A from server 304 using the web browser. The server 304 may return 314 the requested webpage A. Upon receiving the response 314 from server 304, the web browser on user device 302 may load the webpage and the plug-in may execute a set of instructions. The instructions may include information to 1) select all or a portion of the content on webpage A and 2) send a request to server 306 with the selected content for identifying phrases of interest in the content. As a result, the web browser may send a request with the selected content 316 to server 306. In response, the server 306 may process the content from webpage A to identify the phrases of interest based on a reference (as explained in the discussion pertaining to FIG. 4 below). The server 306 may send a response 318 to the web browser on user device 302 indicating the phrases of interest. HTML tags may be used to identify the phrases of interest in the response 318. The web browser on user device 302 may display the webpage A with the phrases of interest visually identified to the user (as explained in the discussion pertaining to FIG. 7 below). The web browser plug-in may execute additional instructions to send another request to the server 306 for retrieving information from one or more data sources pertaining to a visually identified phrase of interest on webpage A in response to user input such as hovering a cursor over the phrase of interest. Therefore, in response to hovering a cursor over the phrase of interest, a request may be sent to server 306 with the phrase of interest. The server 306 may retrieve information pertaining to the phrase of interest indicated in the request from one or more data sources and/or a cache and may return the search results to the web browser on user device 302 (as explained in the discussion pertaining to FIG. 10 below). Upon receiving the response from server 306, the web browser plug-in may instruct the web browser to display the search results in an interface such as a dialog box (as explained in the discussion pertaining to FIG. 8 below).

In another illustrative example, a web browser may be running on user device 302. The web browser may include an installed plug-in to process webpages. A user may request 312 a webpage A from server 304 using the web browser. The server 304 may return 314 the requested webpage A. Upon receiving the response 314 from server 304, the web browser on user device 302 may load the webpage and the plug-in may execute a set of instructions. The instructions may include information to 1) select all or a portion of the content on webpage A and 2) send a request to server 306 with the selected content for identifying phrases of interest in the content and for retrieving information pertaining to the identified phrases of interest. As a result, the web browser may send a request with the selected content 316 to server 306. In response, the server 306 may process the content from webpage A to 1) identify the phrases of interest based on a reference (as explained in the discussion pertaining to FIG. 4 below) and 2) retrieve information pertaining to the identified phrases of interest from one or more data sources and/or a cache (as explained in the discussion pertaining to FIG. 10 below). The server 306 may send a response 318 to the web browser on user device 302 including the phrases of interest and search results pertaining to the phrases of interest. HTML tags may be used to identify the phrases of interest and the search results in the response 318. The web browser on user device 302 may display the webpage A with the phrases of interest visually identified to the user (as explained in the discussion pertaining to FIG. 7 below). The plug-in may execute additional instructions to display the search results corresponding to a visually identified phrase of interest on webpage A in response to user input such as hovering a cursor over the phrase of interest. Therefore, in response to hovering a cursor over the phrase of interest, the search results corresponding to the phrase of interest may be displayed in an interface such as a dialog box (as explained in the discussion pertaining to FIG. 8 below).

Although servers 304 and 306 are shown separately for illustration purposes, in other embodiments, the functions performed by servers 304 and 306 may be performed by a single server. In an embodiment, the user device 302 may send a single request to a server and may receive the modified version of the webpage without sending additional requests.

FIG. 3A shows an exemplary architecture 320 in an embodiment of the present invention. User device 322 may send a request for a document such as a webpage to a webserver 326. In response, the webserver 326 may send the requested webpage to the user device 322 along with information identifying phrases of interest in all or a selected portion of the webpage. The user device 322 may display the webpage with visual identifications identifying the phrases of interest based on the information sent from server 326. In a further embodiment, the information sent from server 326 may additionally include search results associated with the identified phrases of interest retrieved from one or more data sources and/or a cache (as explained in the discussion pertaining to FIG. 10 below). The search results corresponding to the phrases of interest may be displayed by the user device 322 in an interface such as a dialog box (as explained in the discussion pertaining to FIG. 8 below).

In an illustrative example, a web browser may be running on user device 322. A user may request a webpage A from server 326 using the web browser. The server 326 may retrieve the requested webpage A and determine phrases of interest in all or a portion of webpage A (as explained in the discussion pertaining to FIG. 4 below). In an alternate embodiment, the phrases of interest in all or a portion of webpage A may have been determined in advance prior to receiving the request from the web browser. Specifically, at the point in time when webpage A is stored on server 326, the phrases of interest may be determined and HTML tags identifying the phrases of interest may be stored within webpage A. The server 326 may then return the requested webpage A along with HTML tags identifying the phrases of interest in webpage A to the web browser on user device 322. The web browser on user device 322 may display the webpage A with the phrases of interest visually identified to the user (as explained in the discussion pertaining to FIG. 7 below). In an embodiment, the webpage A sent by server 326 may additionally include Javascript instructions to send another request to a server 326 for retrieving information from one or more data sources pertaining to a visually identified phrase of interest on webpage A in response to user input such as hovering a cursor over the phrase of interest. Therefore, in response to hovering a cursor over the phrase of interest, a request may be sent to server 326 with the phrase of interest. The server 326 may retrieve information pertaining to the phrase of interest indicated in the request from one or more data sources and/or a cache and may return the search results to the web browser on user device 322 (as explained in the discussion pertaining to FIG. 10 below). Upon receiving the response from server 326, the Javascript may instruct the web browser to display the search results in an interface such as a dialog box (as explained in the discussion pertaining to FIG. 8 below). In an alternate embodiment, the Javascript may not be sent by the server 326 but a set of instructions may be generated/executed by the web browser's plug-in as explained previously in the discussion pertaining to FIG. 3.

In another illustrative example, a web browser may be running on user device 322. A user may request a webpage A from server 326 using the web browser. The server 326 may retrieve the requested webpage A and 1) determine phrases of interest in all or a portion of webpage A (as explained in the discussion pertaining to FIG. 4 below) and 2) retrieve information pertaining to the phrases of interest from one or more data sources and/or a cache (as explained in the discussion pertaining to FIG. 10 below). In an alternate embodiment, the phrases of interest in all or a portion of webpage A may have been determined in advance prior to receiving the request from the web browser. Specifically, at the point in time when webpage A is stored on server 326, the phrases of interest may be determined and HTML tags identifying the phrases of interest may be stored within webpage A. In an embodiment, information pertaining to the phrases of interest from one or more of the data sources and/or a cache may have been retrieved in advance prior to receiving the request from the web browser. Specifically, at the point in time when webpage A is stored on server 326, the search results pertaining to the phrases of interest may be retrieved and stored within webpage A. The server 326 may send a response to the web browser on user device 322 including the phrases of interest and search results pertaining to the phrases of interest. HTML tags may be used to identify the phrases of interest and the search results in the response. The web browser on user device 322 may display the webpage A with the phrases of interest visually identified to the user (as explained in the discussion pertaining to FIG. 7 below). In an embodiment, the webpage A sent by server 326 may additionally include Javascript instructions. The Javascript may include instructions to display the search results corresponding to a visually identified phrase of interest on webpage A in response to user input such as hovering a cursor over the phrase of interest. Therefore, in response to hovering a cursor over the phrase of interest, the search results corresponding to the phrase of interest may be displayed in an interface such as a dialog box (as explained in the discussion pertaining to FIG. 8 below). In an alternate embodiment, the Javascript may not be sent by the server 326 but a set of instructions may be generated/executed by the web browser's plug-in as explained previously in the discussion pertaining to FIG. 3.

In an embodiment, when a user requests a webpage via a browser, the request may be redirected by the browser to an intermediary server which does not directly host the webpage. That intermediary server may retrieve the webpage from a second server which hosts the webpage and may process the webpage as described in the examples above. In an embodiment, the redirection may be performed by the web browser's plug-in. In an illustrative example, a user may request a web page via a web browser. Instead of sending the request to a server, server A, which directly hosts that web page, a plug-in in the web browser may redirect the request to server B (e.g., server 326). Server B may then retrieve the web page from server A (and/or a cache), process the webpage, and send a response to the web browser including the webpage, phrases of interest, and/or information pertaining to the phrases of interest as described in the examples above.

In an embodiment, the communication between the user device and the servers may be asynchronous. In an embodiment, some steps may overlap others and/or the steps may be performed in parallel. For example, returning to FIG. 3, the user device 302 may receive the original webpage from server 304 and may start displaying the original webpage and send the request to server 306 in parallel. When the modification information from server 306 is received by user device 302, the user device 302 may apply the modifications to the displayed webpage dynamically.

In an embodiment, some or all of the functionality of the servers may be performed by the user device to reduce the processing load placed on servers or to eliminate the need for one or more of the servers. This may improve actual and/or perceived performance for the user. In an illustrative example, a web browser may be running on user device 302. The web browser may include an installed plug-in to process webpages. A user may request 312 a webpage A from server 304 using the web browser. The server 304 may return 314 the requested webpage A. Upon receiving the response 314 from server 304, the web browser on user device 302 may load the webpage and the plug-in may execute a set of instructions. The instructions may include information to process the content from webpage A to 1) select all or a portion of the content on webpage A and 2) identify the phrases of interest based on a reference (as explained in the discussion pertaining to FIG. 4 below). The reference may be stored on the user device 302 and this processing may occur on the user device 302. HTML tags may be generated by the plug-in to identify the phrases of interest in webpage A. Therefore, in this embodiment, the functionality of determining phrases of interest may be moved from server 306 to user device 302. The web browser on user device 302 may display the webpage A with the phrases of interest visually identified to the user (as explained in the discussion pertaining to FIG. 7 below). The web browser plug-in may execute additional instructions to send a request to the server 306 for retrieving information from one or more data sources pertaining to a visually identified phrase of interest on webpage A in response to user input such as hovering a cursor over the phrase of interest. Therefore, in response to hovering a cursor over the phrase of interest, a request may be sent to server 306 with the phrase of interest. The server 306 may retrieve information pertaining to the phrase of interest indicated in the request from one or more data sources and/or a cache and may return the search results to the web browser on user device 302 (as explained in the discussion pertaining to FIG. 10 below). Upon receiving the response from server 306, the web browser plug-in may instruct the web browser to display the search results in an interface such as a dialog box (as explained in the discussion pertaining to FIG. 8 below).

In another embodiment, the functions performed by servers 304, 306, and/or 326 may be performed by more than two servers to achieve parallel processing. In an embodiment, the functions performed by servers 304, 306, and/or 326 may be run on virtualized hardware. In an embodiment, the functions performed by servers 304, 306, and/or 326 may be run on services such as Google AppEngine and Heroku where the infrastructure may be completely abstracted away.

Figure 4:
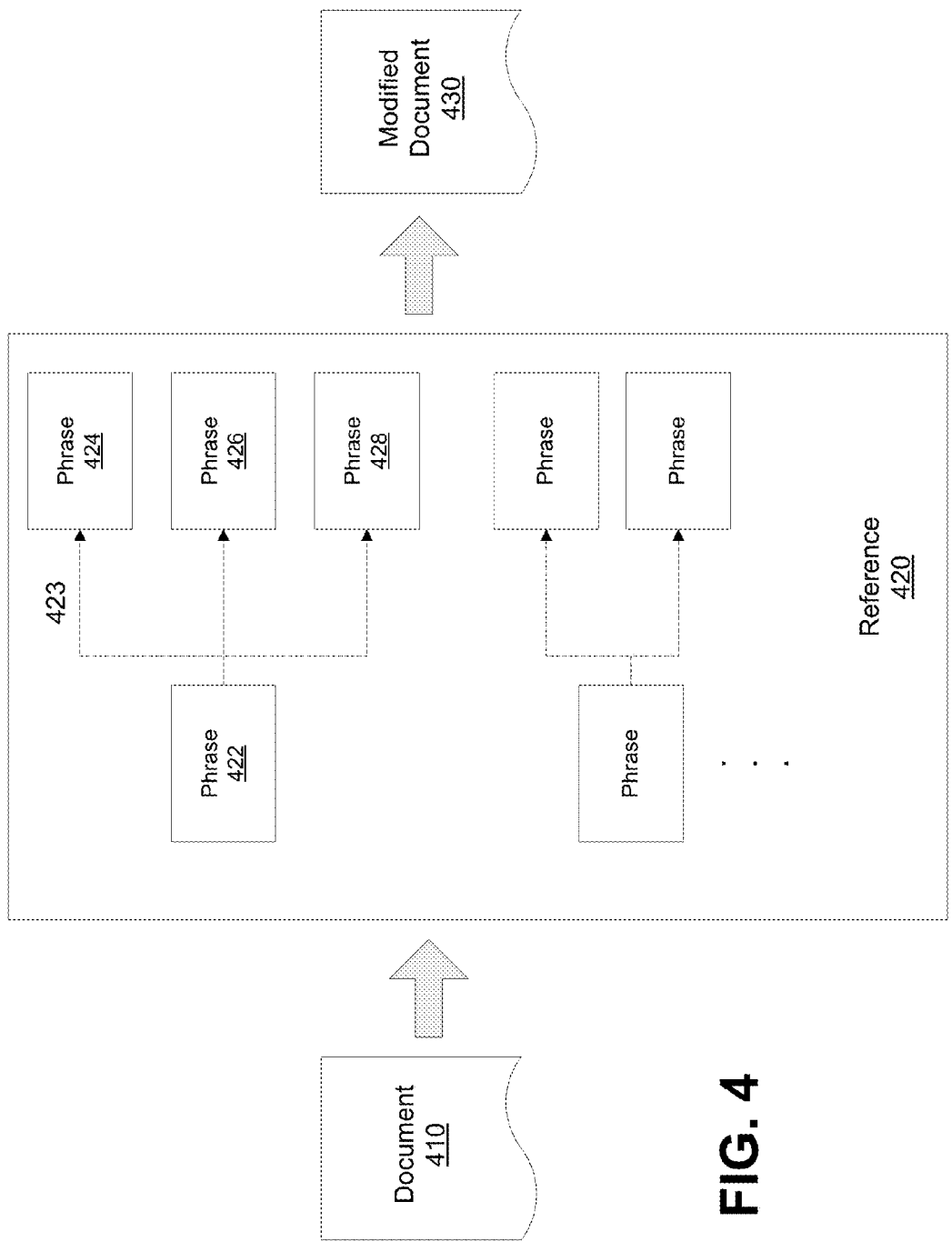
FIG. 4 illustrates processing of a document according to an embodiment.

FIG. 4 illustrates processing of a document according to an embodiment. A document 410 may be processed by a server (e.g., server 306) and/or a user device (e.g., user device 302). The document 410 may be any type of electronic document such as a webpage, an e-mail, a word-processing document, or a spreadsheet. Text from document 410 may be extracted. In an embodiment, text may be extracted only from a selected portion of document 410. The document may be partitioned into blocks and the text from particular block(s) of the document may be extracted. For example, a webpage document may include multiple sections such as a top navigation section, a body content section, a top right advertising section, a bottom right advertising section, a comments section (e.g., similar to the comments sections found on blogging websites), and a footer section. User and/or application settings may define the section(s) of the webpage from which text should be extracted. For instance, user settings may define that the body section of the webpage includes the relevant content and therefore, only the text from the body section may be extracted. A client (e.g., user device 302) and/or a server (e.g., server 306) may identify the relevant content. From the extracted text, phrases (one or more words) of interest may be identified based on information in reference 420 (e.g., a lexical database). Based on the identification of phrases, the document 410 may be modified 430 (e.g., modification of the displayed webpage by user device 302).

In an embodiment, the reference 420 may include one or more phrases designating concepts. The reference may be organized in a hierarchical structure. In an embodiment, each phrase in the reference may be associated with an optimal phrase. If a portion of the extracted text matches a phrase from the reference 420, that corresponding portion of text may be identified as a phrase of interest. For example, the reference 420 may include a phrase 424 and phrase 424 may be "computer science education." Therefore, if a portion of the extracted text is also "computer science education," that portion may be identified as a phrase of interest.

In an embodiment, reference 420 may define associations/relationships between phrases. For instance, phrase 422 may be associated with phrases 424, 426, and 428. Reference 420 may define any predetermined type of association between phrases depending on the context in which reference 420 is utilized. For example, reference 420 may define "broad," "narrow," "related," "preferred," and "used for" associations. A broad/narrow association may connect a phrase such as "education" with a narrower phrase such as "computer science education" and vice-versa. A related association may connect a phrase such as "4G mobile communication" with a related phrase such as "3G mobile communication." A preferred association may connect a phrase such as "2D display" with a more accurate or preferred phrase in a related art such as "two dimensional display." A used for association may connect a phrase such as "autonomous underwater vehicle" with a less accurate or less preferred phrase in a related art such as "AUV." In an embodiment where the reference 420 defines phrases and associations related to sports, the association types may be player/team, coach/sport, player/sport, player/points per game, team/assists per game, etc. In an embodiment where the reference 420 defines phrases and associations related to movies, the association types may be actress/award, actor/movie, director/screenwriter, sequel/prequel, etc. An illustrative example of a reference 420 may be a thesaurus. The thesaurus may include a list of phrases and for each phrase the thesaurus may list phrases which are synonyms to the respective phrase.

A reference may be visualized as a graph with nodes and edges connecting the nodes. Phrases may be represented by the nodes and the relationships between the phrases may be represented by the edges.

In an embodiment, in addition to identifying phrases of interest, optimal phrases associated with the phrases of interest may be identified. Optimal phrases may be preferred words to describe the concept and may yield better search results when used as search terms instead of the respective phrases of interest. In this embodiment, the user and/or application may pre-define the rules which determine an optimal associated phrase. For example, an optimal associated phrase may be defined as the phrase with a "preferred" association with the phrase of interest. Based on the identification of optimal phrases, the document 410 may be modified 430.

Figure 5:
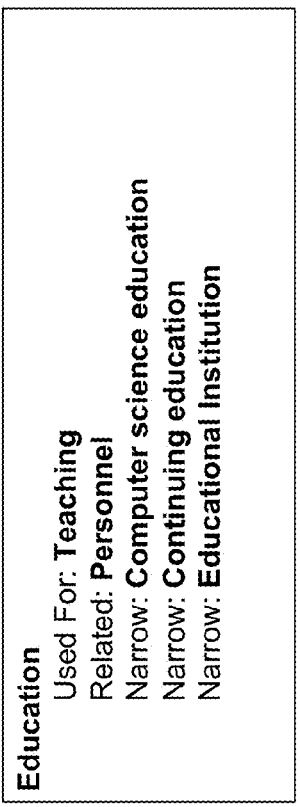
FIG. 5 illustrates an exemplary reference according to an embodiment.
Figure 6:
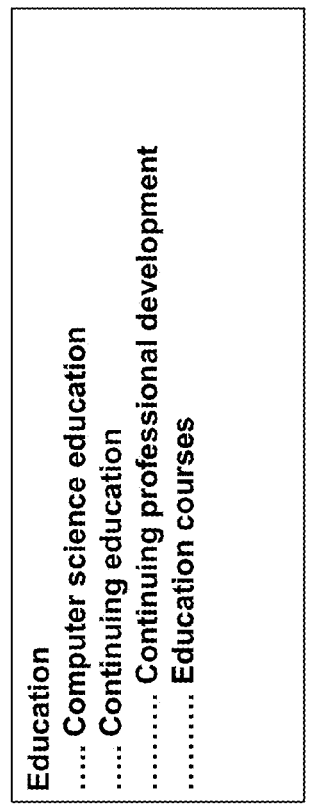
FIG. 6 illustrates an exemplary reference according to an embodiment.

FIGS. 5 and 6 illustrate two references 500 and 600 respectively according to exemplary embodiments. In an embodiment, reference 500 may define associations between phrases using multiple association types such as "used for" associations, "related" associations, and "narrow" associations. In another embodiment, reference 600 may define associations between phrases as a hierarchy, where a broad phrase (e.g., "education") is higher on the hierarchy than a narrow phrase (e.g., "continuing education"). The above examples are illustrative and that any type of association between phrases may be defined in reference 420 based on the context in which reference 420 is utilized.

In an illustrative example, a phrase defined in a reference may be "accidents." The associated optimal phrase defined in the reference may be "accidents." An associated broad phrase defined in the reference may be "accident prevention." Associated related phrases defined in the reference may be "domestic safety," "electric shock," "emergency services," "explosions," "fires," "hazardous areas," "occupational health," "occupational safety," "oil pollution," "product safety," and "risk analysis." Associated narrow phrases defined the reference may be "aerospace accidents," "electrical accidents," "industrial accidents," "marine accidents," "railway accidents," and "road accidents."

In an illustrative example, a phrase defined in a reference may be "acoustomagnetic effects." The associated optimal phrase defined in the reference may be "magnetoacoustic effects."

In an illustrative example, a phrase defined in a reference may be "actuators." The associated optimal phrase defined in the reference may be "actuators." An associated broad phrase defined in the reference may be "control equipment." Associated related phrases defined in the reference may be "control systems," "servomechanisms," "servosystems," and "shape memory alloys." Associated narrow phrases defined the reference may be "electrostatic actuators," "hydraulic actuators," "intelligent actuators," and "microactuators."

The reference may be organized and/or stored in any format including one or more tables in a database and/or memory, one or more files, one or more user defined objects, etc. The reference 420 may be normalized or denormalized as necessary to optimize system performance. In an embodiment, some or all of the information in reference 420 may be cached prior to processing document 410 to improve the search performance. In an embodiment, the phrases of interest identified in a document and an identifier identifying the document (e.g., the uniform resource locator (URL) of the document) may be stored/cached. For future processing of the same document, the cache/stored phrases of interest may be returned. In an embodiment, the cached/stored phrases may expire after a predetermined amount of time to avoid returning stale data.

Returning to FIG. 4, in an embodiment, if overlapping portions of the extracted text match more than one phrase in the reference 420, the defined associations may be utilized to resolve ambiguity. For example, the extracted text may be: "A computer science education is now offered at the University." Phrase 422 may be "education" and phrase 424 may be "computer science education." Therefore there is ambiguity as to whether "computer science education" should be identified as a phrase of interest in the extracted text or whether "education" should be identified as a phrase of interest in the extracted text. The association 423 between phrase 422 and 424 may indicate a broad/narrow relationship and an application/user setting may indicate that phrases of interest should be narrow rather than broad. Therefore the narrower phrase, "computer science education" may be identified as the phrase of interest instead of "education."

In an embodiment, after identifying the phrases of interest, document 410 may be modified such that the visual properties associated with the phrases of interest changed to distinguish them from the rest of the content in document 410. FIG. 7 illustrates a modified document 700 according to an embodiment. As shown, the phrases of interest 702, 704, 706, and 708 are underlined to distinguish them from the rest of the text. Although the phrases of interest are underlined in this example, any visual property or combination of visual properties associated with the phrases of interest may be modified. The visual properties may include font type, font size, font weight (e.g., "bold"), font style (e.g., italicization), underlining, shading, highlighting, shadowing, three-dimensional effects, etc. In an embodiment, the phrases of interest may be displayed on a pre-determined portion of the document 410. For example, a module may be built and displayed in the right or left portion of the page (similar to a recommendations module), and the module may present the phrases of interest.

Figure 8:
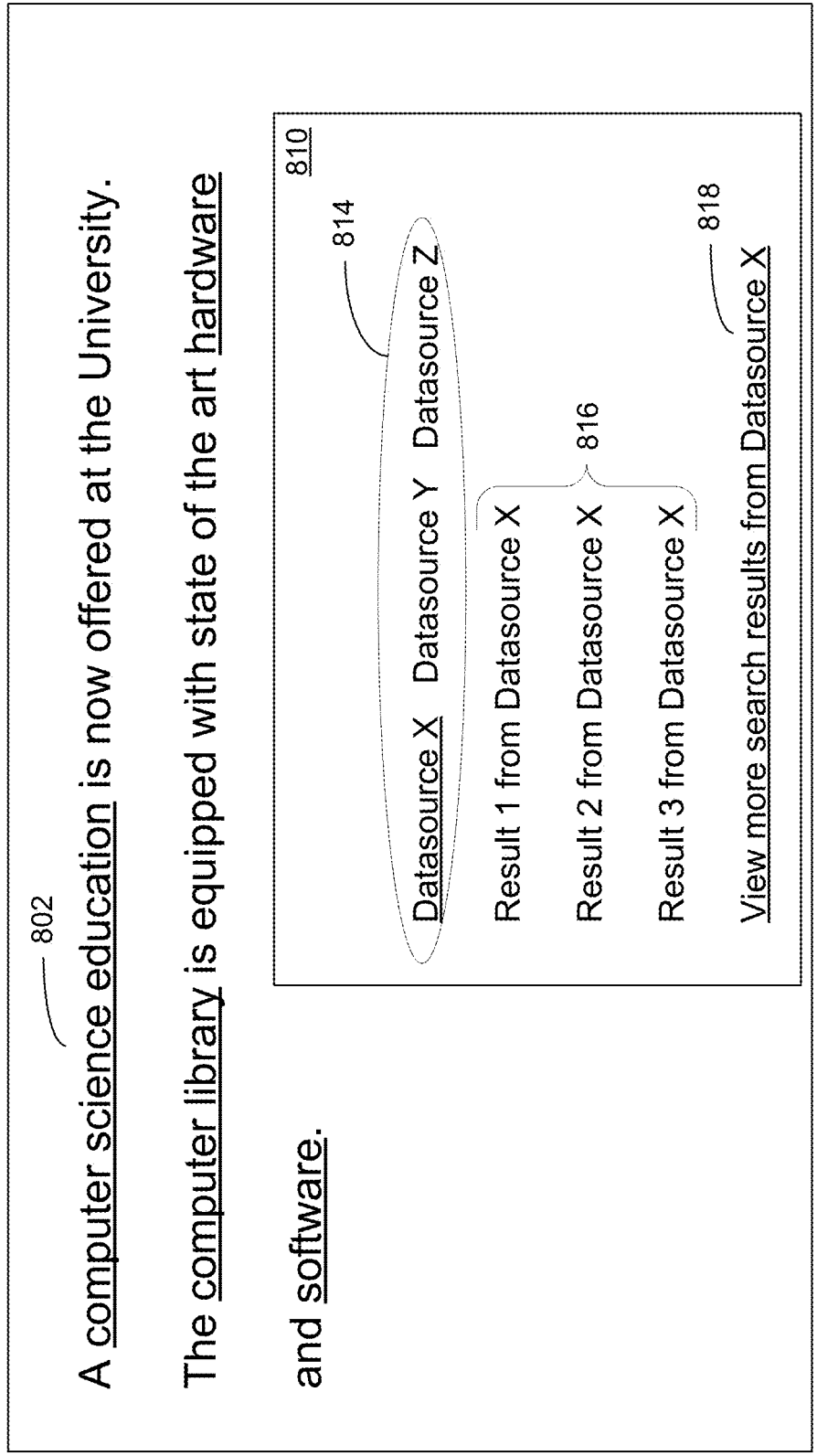
FIG. 8 illustrates a modified document according to an embodiment.

In an embodiment, in addition to changing the visual properties of the phrases of interest in document 410, processes/functions triggered by user input may be associated with the phrases. FIG. 8 illustrates a modified document 800 according to an embodiment. In an embodiment, user input such as hovering a cursor over the phrase 802, "computer science education" may trigger the display of an interface 810 such as a dialog box. Dialog box 810 may present information associated with the phrase of interest 802, "computer science education," such as results 816 from searches conducted in one or more data sources 814 with the search term, "computer science education." A data source may be a logically grouped data set which may be sourced from one or more databases, files, and/or indices which may be stored on one or more disks or may reside in memory. For example, data sources 814 may include data sources storing data pertaining to conferences, societies, subscriptions, research, education, careers, news, etc.

In an alternate embodiment, dialog box 810 may present information associated with an optimal phrase associated with "computer science education" as defined by a reference (e.g., reference 420). In this embodiment, the user and/or application may pre-define the rules which determine an optimal associated phrase. In an exemplary embodiment, an optimal associated phrase may be defined as the phrase with a "preferred" association with "computer science education." For example, the phrase "computer engineering education" may be the preferred phrase to "computer science education." Therefore, dialog box 810 may present information associated with "computer engineering education" (instead of "computer science education") such as results 816 from searches conducted in one or more data sources 814 with the search term, "computer engineering education." In an embodiment, a phrase and its associated optimal phrase may be the same. In an embodiment, if an optimal associated phrase is not found in the reference, dialog box 810 may present information associated with the phrase of interest 802 ("computer science education") by default.

In an embodiment, dialog box 810 may present information associated with the phrase 802 (or the optimal associated phrase) and additional parameters. These additional parameters may include information in the document 800, web browsing history, geographical location information, web transaction history (e.g., purchases made via the Internet), and user declared information such as user preferences. For example, the user may be located in New York while viewing dialog box 810. Therefore, dialog box 810 may present information associated with "computer science education" and "New York" such as results 816 from searches conducted in one or more data sources 814 with the search term, "computer science education" and "New York."

In an embodiment, the user may customize the information displayed on the modified document 800 and the interface 810 through configuration settings. The user may modify configuration settings to selectively allow or block topics and/or phrases to control the phrases of interest identified on document 800. For example, the user may modify a setting to block identification of the phrase "computer science education." As a result, the phrase 802 may no longer be underlined (or otherwise visually distinguished) on document 800. Similarly, the user may modify a setting to only allow identification of the phrases: "computer library" and "hardware." Consequently, only the phrases "computer library" and "hardware" may be underlined on document 800. In another example, the user may modify a setting to block identification of the topic, "computers." "Computer science education," "computer library," "hardware," and "software" may belong to the topic, "computers." Therefore, none of the phrases in document 800 may be underlined. The user may also specify broader topics to avoid. For example, if the user blocks the broad topic, "aerospace," this block will propagate automatically to the children/grandchildren/etc., of aerospace.

In an embodiment, the user may modify configuration settings to specify the data sources to be used for displaying the information in interface 810. For example, the user may modify a setting to utilize only data source A. Therefore, interface 810 may only display a link to data source A and results from searches conducted in data source A. In another example, the user may specify additional data sources such as Google's search engine or Wikipedia.

In an embodiment, the user may modify configuration settings to customize the visual properties which indicate phrases of interest. For example, the user may modify the settings so that the phrases of interest are highlighted and underlined. In an embodiment, the user may modify the settings to selectively specify visual properties for particular phrases of interest and/or particular topics. For example, the user may modify the settings so that all phrases of interest associated with a particular topic are underlined in red.

In an embodiment, the user may modify configuration settings to specify the references to be used when determining the phrases to be identified in document 800. For example, a user accessing a document to view sports related news may modify the configuration settings to utilize a reference with sports phrases and associations.

The user may modify configuration settings through the application displaying/processing document 800, a plug-in installed as an add-on to the application, and/or directly modifying a configuration file through an interface. For example, if the user is viewing document 800 through a web browser such as Google's Chrome™ browser, the user may change the configuration settings of a Chrome™ extension which controls the visual identification of phrases of interest.

In an embodiment, the above discussed settings may be configurable on the server side by, for example, a webmaster.

Interface 810 is shown as a dialog box for illustration purposes. Interface 810 may be a pop-up window, a browser window, a toolbar, a tab (such as a browser tab), and/or any viewable portion of the document 800.

In an embodiment, user input such as clicking on any one of the links 814 to data sources—data source X, data source Y, or data source Z—may display the results from the respective data source in dialog box 810. In an embodiment, additional results may be displayed to the user via a data source search interface (such as a new webpage) in response to user input such as double-clicking on one of the data sources 814. In an alternate embodiment, the additional search results from data source X may be displayed to the user via a data source search interface in response to user input such as clicking on link 818 which may include a description such as "view more search results from data source X."

Figure 9:
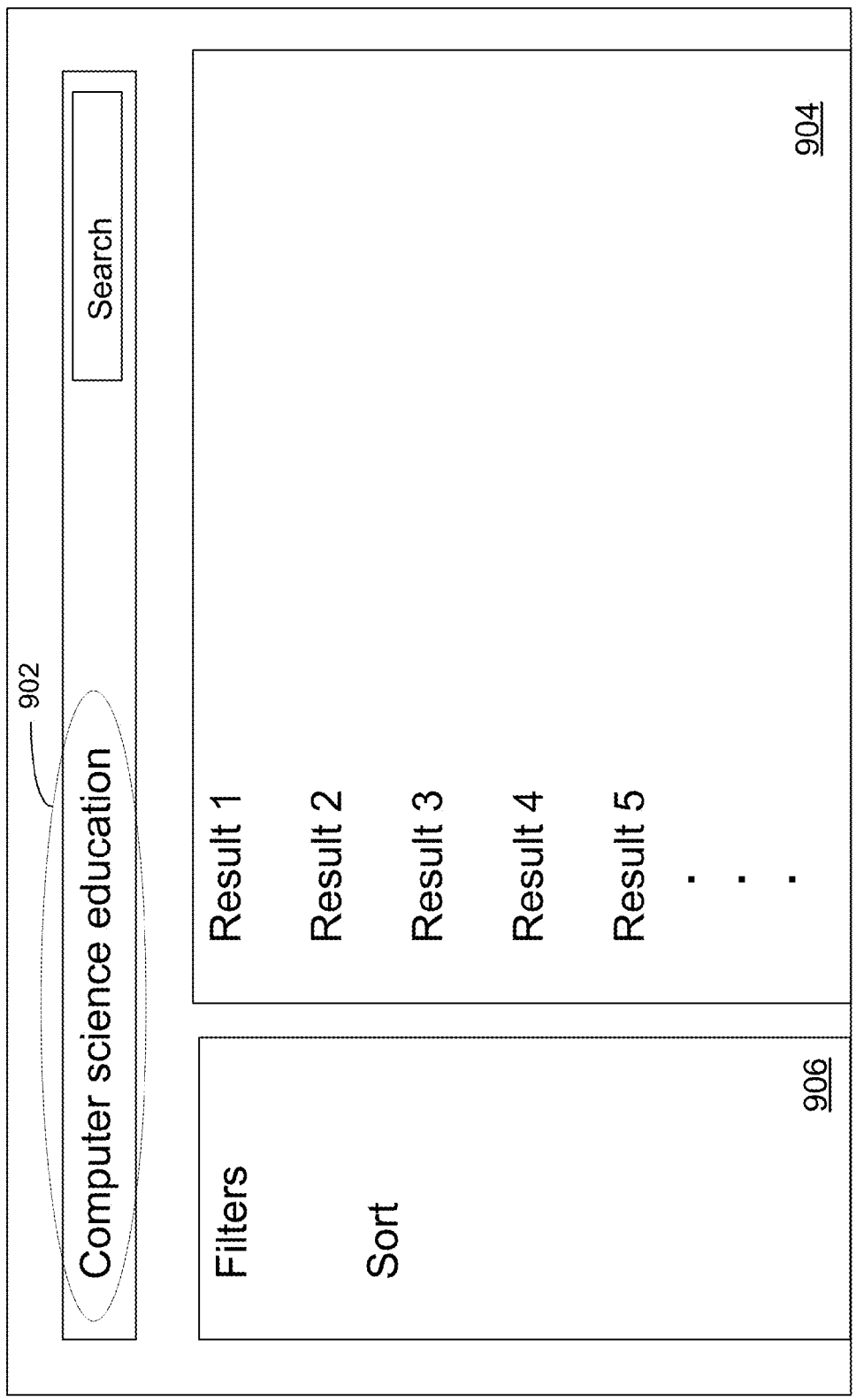
FIG. 9 illustrates an exemplary data source search interface according to an embodiment.

FIG. 9 illustrates an exemplary data source search interface 900 according to an embodiment. The data source search interface 900 may be displayed to the user in response to user input associated with a data source via a prior interface (e.g., double clicking on a link 814 to data source shown in dialog box 810). The data source search interface 900 may automatically retrieve search results using a phrase 902 associated with the prior interface as a search term (e.g., phrase 802). The retrieved search results may be automatically displayed 904. The data source search interface 900 may display filtering and sorting functions 906 to narrow and/or organize the search results 904 as needed. In an embodiment, other search parameters in addition to the phrase 902 may be automatically utilized to retrieve and/or filter the search results. These parameters may include information from a previously accessed document, web browsing history, geographical location information, web transaction history (e.g., purchases made via the Internet), and user declared information such as user preferences.

Figure 10:
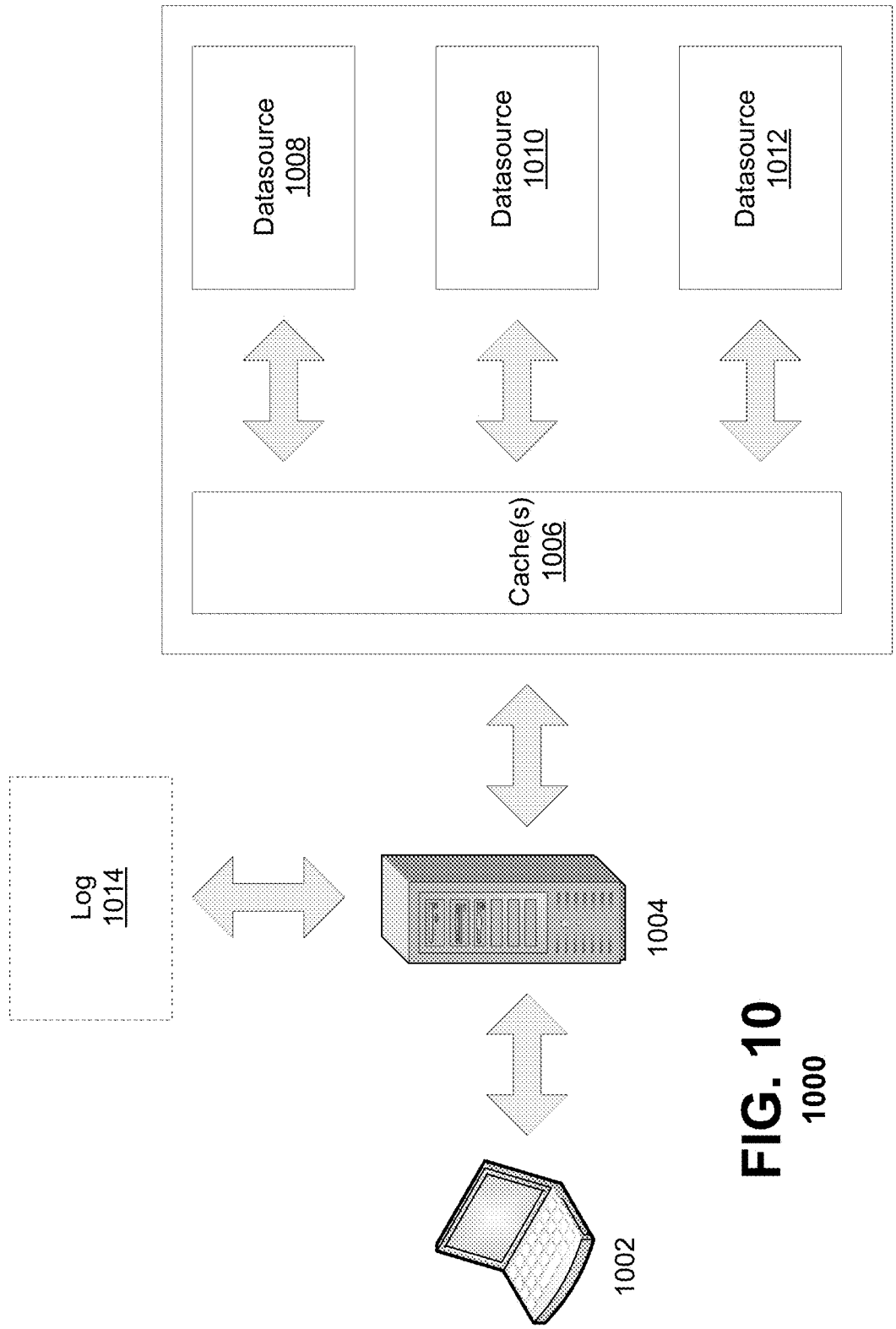
FIG. 10 shows an exemplary architecture in an embodiment.

FIG. 10 shows an exemplary architecture 1000 in an embodiment of the invention. User device 1002 may send a request to a server 1004 for information pertaining to a phrase. In response, the server 1004 may retrieve the requested information from one or more caches 1006 and/or one or more data sources 1008, 1010, and 1012. The server may format the retrieved information if necessary and send the information to the user device 1002. The user device 1002 may then display information pertaining to the phrase (e.g., dialog box 810).

In an embodiment, in response to receiving a request from user device 1002, server 1004 may conduct a search using the phrase from the request as a search term in the cache 1006 and/or the data sources 1008, 1010, and 1012. In an embodiment, the server 1004 may use other search parameters in addition to the phrase to tailor the search results. These parameters may include information from a user accessed document such as a web page, web browsing history, geographical location information, web transaction history (e.g., purchases made via the Internet), and user declared information such as user preferences. In an embodiment, the user device 1002 may send one or more of the additional search parameters along with the request to server 1004.

In an embodiment, the results from searches conducted in data sources 1008, 1010, and 1012, may be pre-cached in cache 1006 prior to receiving the request from user device 1002. Server 1004 may read phrases from one or more references (e.g., reference 420), conduct searches for each phrase in data sources 1008, 1010, and 1012, and cache these results in cache 1006. In an embodiment, the searches may be conducted for all phrases in the references and the results may be stored in cache 1006. In another embodiment, the searches may be conducted for a subset phrases in the references and the results may be stored in cache 1006. For example, search results may be pre-cached for the most frequently searched phrases. In an embodiment, for each pre-cached search conducted, a predetermined number of results may be saved in cache 1006. In an embodiment, the data in cache 1006 may be refreshed at predetermined time intervals.

In an alternate embodiment, the server 1004 may cache the search results from data sources 1008, 1010, and 1012 when the server 1004 receives search requests. The server 1004 may first check if the requested results are cached in cache 1006. If so, the server 1004 may return the cached results. If not, the server 1004 may retrieve the results from the data sources, cache the results for future queries, and send the requested information to the user device 1002.

In an embodiment, the server 1004 may save information sent from user device 1002 to a log 1014. The logged information may include user input statistics, user identifiers (e.g., e-mail address, user name, etc.), advertising identifiers, user device identifiers, application identifiers for applications running on user device 1002, information from previously accessed documents such as webpages, web browsing history, geographical location information, web transaction history (e.g., purchases made via the Internet), and user declared information such as user preferences. User input statistics may include information such as phrases on which the user hovered the cursor, the number of times the cursor hovered on a highlighted phrase, the data sources which the user clicked on, the number of times the user clicked on a data source, the actions taken by the user when searching via a data source search interface (e.g., sorting, filtering, parameters used for filtering), the sequence of the actions taken by the user, etc. The log 1014 may include one or more databases and/or one or more files. The logged information may be used for purposes such as data mining, providing the user with targeted advertising and/or tailored application functionality.

In an embodiment, some or all of the functionality of server 1004 may be performed by the user device 1002 to reduce the processing load placed on server 1004 or to eliminate the need for server 306 completely. In another embodiment, the functions performed by server 1004 may be performed two or more servers to achieve parallel processing.

FIG. 11 illustrates a modified document 1100 indicating phrases of interest and processes associated with the phrases according to an embodiment. In this embodiment, user input such as right-clicking a cursor over the phrase of interest 1102, "computer library," may trigger the display of an interface 1110 such as a right-click menu. Right-click menu 1110 may present various functions associated with the phrase of interest 1102, "computer library," including a function to replace the phrase of interest with a more optimal phrase as defined by a reference (e.g., reference 420). The user and/or application may pre-define the rules which determine an optimal associated phrase. In an exemplary embodiment, an optimal associated phrase may be defined as the phrase with a "preferred" association with "computer library." For example, the phrase "computer science library" may be the preferred phrase to "computer library." Therefore, activating the "replace with optimal phrase" function via right-click menu 1110 may replace the phrase "computer library" with "computer science library." In an embodiment, the right-click menu 1110 may include a global replace function, "replace all with optimal phrase," which when activated may replace all occurrences of phrase "computer library" with "computer science library." In an embodiment, if an optimal associated phrase is not found in the reference, right-click menu 810 may not present the "replace with optimal phrase" or "replace all with optimal phrase" options. The function descriptions, "replace with optimal phrase" and "replace all with optimal phrase," may be worded differently in other embodiments as long as the description conveys the underlying functionality to the user.

In an embodiment, the data required to display the relevant functions within right-click menu 1110 may be included in metadata associated with phrases of interest sent by a server (e.g., server 306). An application displaying/processing document 1100 and/or a plug-in installed as an add-on to the application may enable the display of the right-click menu with the relevant functions based on the metadata. For example, if the user is editing document 1100 through a word-processing application, the word-processing application and/or a plug-in installed as an add-on to the word-processing application may enable the display of the right-click menu with the relevant functions based on the metadata.

Interface 1110 is shown as a right-click menu for illustration purposes. Interface 1110 may be a toolbar, a dialog box, and/or any viewable portion of the document 1100.

In an embodiment, the functionality pertaining to the description of FIG. 11 may augment the functionality of a word processing system/software and/or a document creation system/software.

User input in the illustrations above may be implemented in many ways including implementation through a mouse, keyboard, trackball, joystick, sensor on a touch screen of a device displaying the document, etc. In an embodiment, user input may be implemented through a motion sensor. For example, shaking and/or tilting a PC tablet with a motion sensor in a particular manner may translate into different forms of user input.

Although many of the above examples reference webpage documents for illustration purposes, the above principles apply to any type of document, media, and/or file including e-mails, word-processing documents, spreadsheets, PDF documents, webpages, text messages, and video.

Figure 13:
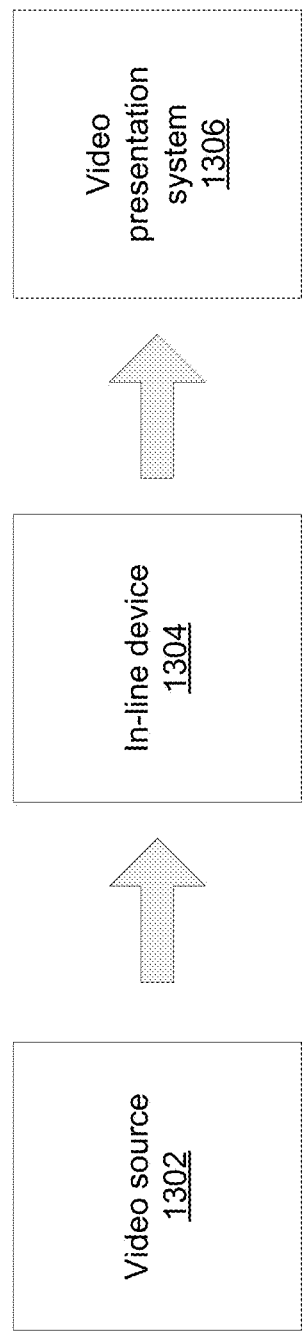
FIG. 13 shows an exemplary architecture in an embodiment.

Although many of the examples above are directed to document processing for illustrative purposes, the principles discussed are applicable in various subject areas. For example, in an embodiment, the above principles may be applied to interactive movies. FIG. 13 shows an exemplary architecture 1300 in an embodiment of the present invention. In an embodiment, an in-line device 1304 between a video source 1302 and a video presentation system 1306 may accept an incoming video stream, apply some heuristics to identify what is being displayed on the video presentation system 1306, and then display related information to what is on the screen of the video presentation system 1306. For example, a movie may be streamed via a set top box 1304. The set top box 1304 may identify actors as they appear in the movie (e.g., phrases of interest), may allow the viewer to hover over the moving image and retrieve information about that actor (e.g., information retrieved from data sources based on user input associated with a phrase of interest), and may present the retrieved information about the actor on the display screen of the video presentation system 1306.

Figure 14:
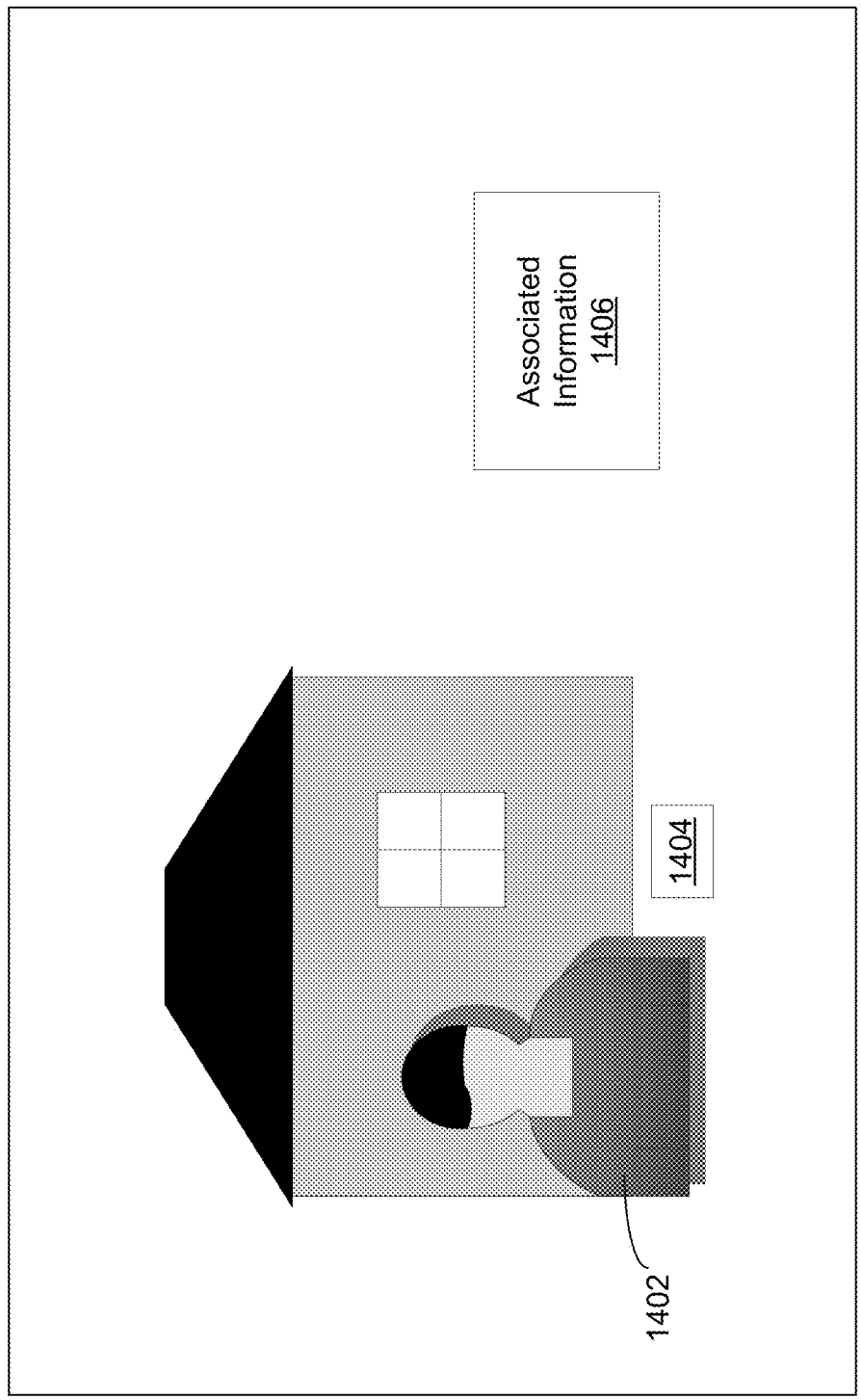
FIG. 14 illustrates a graphical user interface displaying a video according to an embodiment.

FIG. 14 illustrates a graphical user interface (GUI) 1400 displaying a video according to an embodiment. The GUI 1400 may be attached to a video presentation device and/or an in-line device. In an illustrative example, the user may be watching a movie via the GUI 1400. The movie may display a scene with an actor 1402 such as John Travolta. A small indicator 1404 shown on the GUI 1400 may indicate to the user that additional information is available regarding what is being displayed (e.g., the actor 1402). Based on user input, such as hovering over the indicator 1404, to the video presentation device (or in direct communication with the in-line device) display of additional information 1406 associated with the actor 1402 may be triggered.

In an embodiment, a producer may be an entity that produces content. A distributor may be an entity that provides a distribution or delivery method for content. A consumer may be a user of content. Content may be information produced by producer, delivered by distributor, and consumed by consumer, in the various forms including but not limited to text documents, messages, images, videos, or any combination thereof. Relevant content may be a subportion of the content identified as relevant depending on the context. Existing or new technology may be used to perform this identification. Concept may be a specifically and uniquely identified piece of information. A concept may be a word or phrase of text, or may be a reference image or video with adequate information technology that makes it uniquely identifiable by existing or new technology. A concept graph may be a collection of concepts along with zero or more specified relationships among those concepts. A search space may be a public or proprietary corpus of information that can be searched. Examples include the world-wide web, a company's proprietary database, or images within the *.edu domain of the Internet. Search results may be a list resulting from the performance of a search for a concept in a search space. The list is active in that it not only indicates the results of the search, but each entry in the list may provide instant access to expanded content indicated by that entry.

Figure 15:
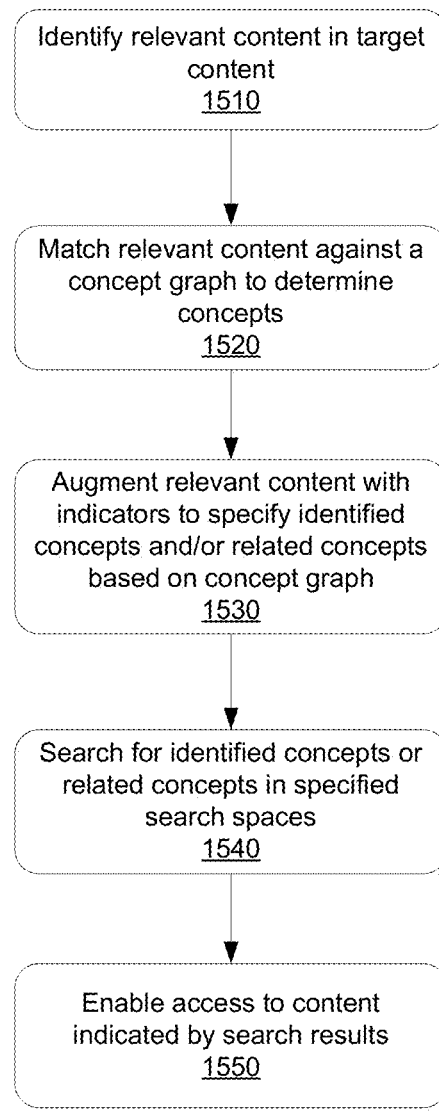
FIG. 15 illustrates a process according to an embodiment.

FIG. 15 illustrates a process 1500 according to an embodiment. The process 1500 may 1) use existing or new technology to identify relevant content in target content 1510, 2) match the relevant content against a concept graph resulting in a list of concepts occurring within the relevant content 1520, 3) augment the relevant content with indicators that specify the identified concepts and/or related concepts according to the relationships in the concept graph 1530, 4) obtain search results from searching for those concepts in various specified search spaces 1540, and 4) enable the consumer to access the content indicated by the search results 1550.

In an illustrative example, a user device (e.g., 322) may process target content (e.g., a webpage) via a web browser. The web browser may include a plug-in to identify relevant content of the web page which needs to be processed 1510. The user device may send the relevant content to a server (e.g., 326). The server may match the relevant content against a concept graph (e.g., reference) to determine a list of concepts (e.g., phrases of interest) occurring within the relevant content 1520. The server may augment the relevant content with indicators that specify the identified concepts (e.g., phrases of interest) and/or related concepts (e.g., optimal phrases) according to the relationships in the concept graph 1530. The server may obtain search results for those identified concepts in various specified search spaces (e.g., data sources) 1540. The server may send a response to the user device with the identified concepts and search results. The consumer may then access the content indicated in the search results (e.g., search results 816) via the web browser 1550.

In an illustrative example, a device (e.g., in-line device 1304) may process target content (e.g., a video stream). The in-line device may identify relevant content (e.g., a particular DVD chapter) of the video stream which needs to be processed 1510. The device may match the relevant content against a concept graph (e.g., reference with movie information) to determine a list of concepts (e.g., actors of interest) occurring within the relevant content 1520. The device may augment the relevant content with indicators that specify the identified concepts (e.g., indicator 1404) and/or related concepts according to the relationships in the concept graph 1530. The device may obtain search results for those identified concepts in various specified search spaces (e.g., databases including movie information) 1540. The consumer may then access the content indicated in the search results (e.g., associated information 1406) 1550.

The above process may be applied by any combination of the producers, distributors, or consumers of the content. The selection of content targets, concept graphs, and search spaces can be decided and configured by producers, distributors, or consumers depending upon the embodiment of the invention. The above process may be implemented by the use of any combination of hardware or software.

Figure 12:
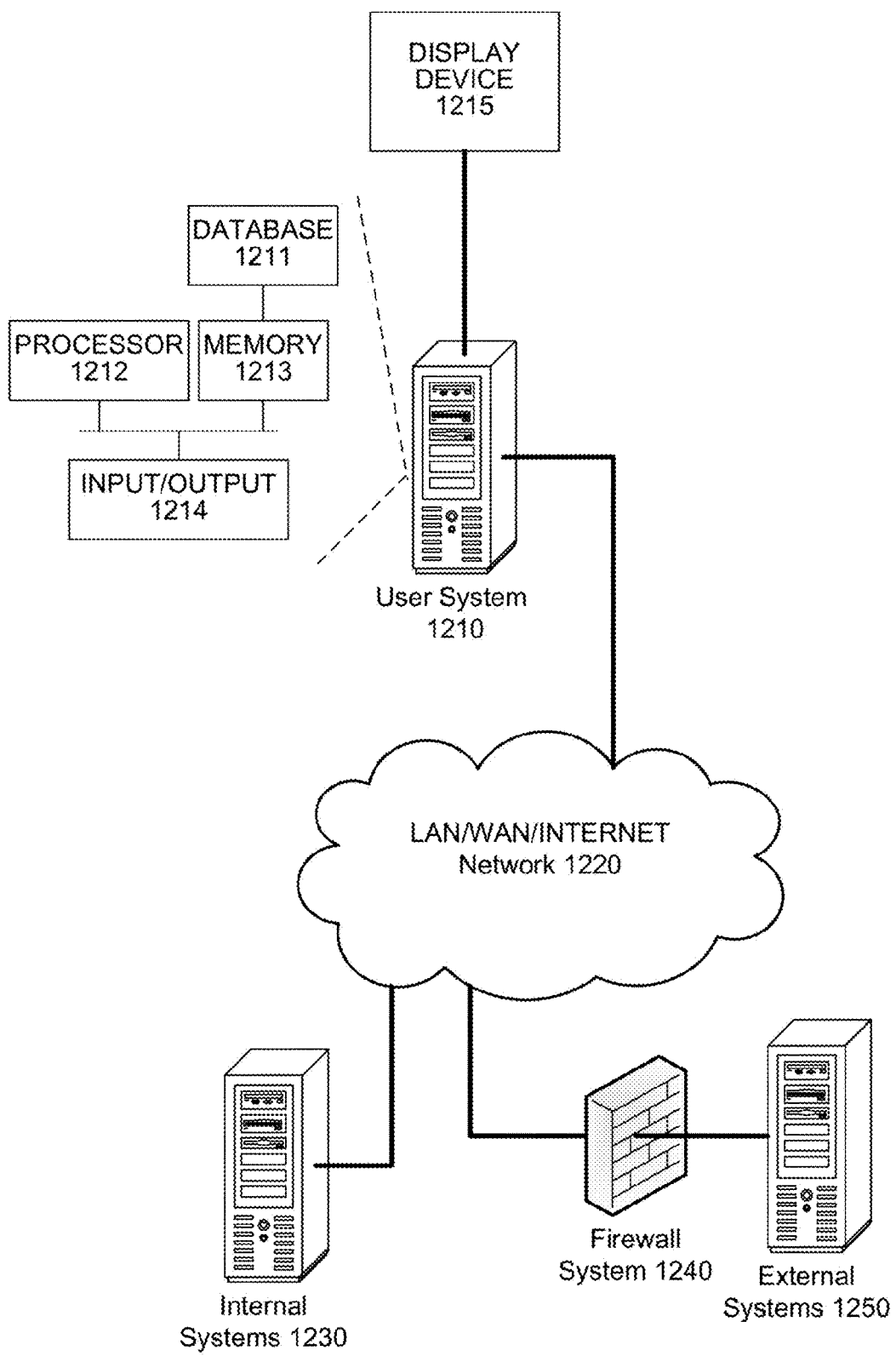
FIG. 12 shows an exemplary architecture in an embodiment.

FIG. 12 shows an exemplary architecture 1200 in an embodiment of the present invention. The user system 1210 may exemplify the user devices illustrated in FIGS. 3 and 10. The user system 1210 may run an application to view, create, or modify documents. The user system 1210 may be coupled to a display device 1215, existing internal systems 1230 through a network 1220 and to external systems 1250 through the network 1220 and firewall system 1240. The user system 1210 may include a desktop computer, laptop computer, tablet PC, client computer, mobile phone, central computer in a vehicle, any device with a touch screen, computers worn by a person such as Google Glass, and any other computer. The display device 1215 may include a computer monitor, a touch screen, a tablet PC screen, a mobile phone screen, and any other displays. The existing internal systems 1230 may include one or more servers (e.g., servers shown in FIGS. 3 and 10) and may provide data/functionality associated with phrases. The external systems 1250 may include one or more servers (e.g., servers shown in FIGS. 3 and 10) and may provide data/functionality associated with phrases. The user system 1210 may interact with the external systems to obtain information through a firewall system 1240 separating the internal systems from the external systems.

While internal systems 1230 and external systems 1250 are included in FIG. 12, in some embodiments, one or both of these systems may not be required. In an embodiment, the functionality provided by the internal systems 1230 and external systems 1250 may be provided by the user system 1210.

Each of the systems in FIG. 12 may include a processing device 1212, memory 1213, a database 1211, and an input/output interface 1214, all of which may be interconnected via a system bus. In various embodiments, each of the systems 1210, 1230, 1240, and 1250 may have an architecture with modular hardware and/or software systems that include additional and/or different systems communicating through one or more networks. The modular design may enable one to add, exchange, and upgrade systems, including using systems from different vendors in some embodiments. Because of the highly customized nature of these systems, different embodiments may have different types, quantities, and configurations of systems depending on the environment and organizational demands.

In an embodiment, memory 1213 may include different components for retrieving, presenting, changing, and saving data. Memory 1213 may include a variety of memory devices, for example, Dynamic Random Access Memory (DRAM), Static RAM (SRAM), flash memory, cache memory, and other memory devices. Additionally, for example, memory 1213 and processing device(s) 1212 may be distributed across several different computers that collectively comprise a system.

Database 1211 may include any type of data storage adapted for searching and retrieval.

Processing device 1212 may perform computation and control functions of a system and comprises a suitable central processing unit (CPU). Processing device 1212 may comprise a single integrated circuit, such as a microprocessing device, or may comprise any suitable number of integrated circuit devices and/or circuit boards working in cooperation to accomplish the functions of a processing device. Processing device 1212 may execute computer programs, such as object-oriented computer programs, within memory 1213.

The foregoing description has been presented for purposes of illustration and description. It is not exhaustive and does not limit embodiments of the invention to the precise forms disclosed. Modifications and variations are possible in light of the above teachings or may be acquired from the practicing embodiments consistent with the invention. For example, some of the described embodiments may include software and hardware, but some systems and methods consistent with the present invention may be implemented in software or hardware alone. Additionally, although aspects of the present invention are described as being stored in memory, this may include other computer readable media, such as secondary storage devices, for example, solid state drives, or DVD ROM; the Internet or other propagation medium; or other forms of RAM or ROM.

We claim:

1. A computer-implemented method comprising:
    in response to a user action, receiving a target content, the target content including embedded instructions relating to selection of relevant content, wherein the relevant content is a subset of the target content;
    displaying the target content;
    based on the embedded instructions, identifying relevant content from the target content;
    extracting logged information specific to the user;
    matching the relevant content against a concept graph and the lodged information, wherein the concept graph includes a plurality of concepts and associations between the plurality of concepts;
determining concepts based on the matching;
augmenting the relevant content with indicators to indicate the determined concepts, wherein the augmenting distinguishes the relevant content from remaining content of the target content and conveys to a user a capability of user action corresponding to the augmented content;
searching for the determined concepts in a plurality of search spaces to obtain search results;
in response to user action on the augmented content, retrieving information indicated by the search results, wherein the searches were performed before the user action on the augmented content; and
displaying at least a portion of the retrieved information concurrently with the display of the target content,
wherein the augmented content and the at least portion of the retrieved information are viewable simultaneously.

2. The method of claim 1, wherein the target content is a webpage and the determined concepts are phrases of interest.

3. The method of claim 1, wherein the target content is a video stream and the determined concepts are related to videos.

4. A computer-implemented method comprising:
in response to embedded instructions in a document, sending a first request, wherein the first request includes at least a text segment of the document;
receiving a first response, wherein the first response indicates phrases of interest in the at least a text segment based on a reference and logged information specific to a user, wherein the reference includes a plurality of phrases and associations between the plurality of phrases;
displaying the document with visual properties distinguishing the phrases of interest from the remaining text of the document, wherein the visual properties convey to the user a capability of user input corresponding to the phrases of interest;
in response to user input corresponding to a phrase of interest on the document, sending a second request to retrieve information associated with the phrase of interest from a data source;
receiving a second response with the retrieved information, wherein the retrieved information includes search results for the phrase of interest from a plurality of data sources, wherein the searches were performed before the user input corresponding to the phrase of interest; and
displaying at least a portion of the retrieved information concurrently with the display of the document,
wherein the phrase of interest on the document and the at least portion of the retrieved information are viewable simultaneously.

5. A computer-implemented method comprising:
in response to embedded instructions in a document, sending a request, wherein the request includes at least a text segment of the document;
receiving a response, wherein the response indicates phrases of interest in the at least a text segment based on a reference and logged information specific to a user, wherein the reference includes a plurality of phrases and associations between the plurality of phrases;
displaying the document with visual properties distinguishing the phrases of interest from the remaining text of the document, wherein the visual properties convey to the user a capability of user input corresponding to the phrases of interest;
in response to a first user input corresponding to a phrase of interest on the document, displaying an interface with an optimal phrase to replace the phrase of interest;
in response to a second user input, replacing the phrase of interest with the optimal phrase;
displaying the document with the optimal phrase and with the visual properties distinguishing the phrases of interest from the remaining text of the document;
in response to a third user input, retrieving search results for the optimal phrase from a plurality of data sources, wherein the searches were performed before the third user input; and
displaying at least a portion of the search results concurrently with the display of the document, wherein the optimal phrase and the at least portion of the search results are viewable simultaneously.

6. An apparatus comprising:
a server, including at least one processor, to:
receive a first request from a user device in response to embedded instructions in a document, wherein the first request includes at least a text segment of the document,
determine phrases of interest in the at least a text segment based on a reference and logged information specific to the user, wherein the reference includes a plurality of phrases and associations between the plurality of phrases,
indicate the phrases of interest in a response to the user device,
transmit a first response to the user device, wherein the first response enables the user device to display the document, visually distinguish the phrases of interest indicated in the response within the document from the remaining text of the document so that to convey to a user a capability of user input corresponding to the phrases of interest, and in response to user input corresponding to a phrase of interest within the document, send a second request to retrieve information associated with the phrase of interest,
receive the second request;
transmit a second response to the user device with the retrieved information, wherein the retrieved information includes search results for the phrase of interest from a plurality of data sources, wherein the searches were performed before the second request was received,
wherein the phrase of interest and at least a portion of the retrieved information are displayed simultaneously.

7. The apparatus of claim 6, wherein the server is further configured to:
include an optimal phrase associated the phrase of interest in the response, wherein the request to retrieve information associated with the phrase of interest from the plurality of data sources includes the optimal phrase.

8. The apparatus of claim 6, further comprising:
a cache to cache an identifier of the document and the determined phrases of interest.

9. An apparatus comprising:
a server, including at least one processor, to:
receive a request from a user device in response to embedded instructions in a document, wherein the request is generated in response to user input associated with an indicated phrase of interest that is displayed with visual properties distinguishing the phrase of interest from the remaining text of a displayed document, the phrase of interest determined based on a reference and logged information specific to the user, the reference including a plurality of phrases and associations between the plurality of phrases, and the request includes the phrase of interest, retrieve search results associated with the phrase of interest from a plurality of data sources, wherein the searches were performed before the request is received, and transmit a response to the user device with the search results, wherein the response enables the user device to display at least a portion of the search results concurrently with the display of the document, wherein the at least a portion of the search results and the phrase of interest are viewable simultaneously.

10. The apparatus of claim 9, wherein the request further includes an optimal phrase associated with the phrase of interest and the optimal phrase is used as a search term to retrieve the search results.

11. The apparatus of claim 9, wherein the request includes additional information to filter the search results, the additional information including at least one of 1) user web browsing history, 2) geographical location information, 3) user web transaction history, 4) user declared information, and 5) information from the document.

12. The apparatus of claim 9, further comprising:
a cache to cache search results, wherein a search using the phrase of interest is conducted prior to receiving the request from the user device and respective search results are saved in the cache, and the server retrieves the search results from the cache.

13. The apparatus of claim 9, further comprising:
a cache to cache the search results, wherein the cached search results are retrieved for future searches associated with the phrase of interest.

14. The apparatus of claim 9, wherein the request includes loggable data, the data including at least one of 1) user input statistics, 2) user identifiers, 3) advertising identifiers, 4) user device identifiers, 5) application identifiers, 6) user web browsing history, 7) geographical location information, 8) user web transaction history, 9) user declared information, and 10) information from the document, and the apparatus further comprises:
a log to store the data.

15. An apparatus comprising:
a server, including a processor, to:
receive a request from a user device for a document;
retrieve the document, wherein the document includes embedded instructions;
identify at least a text segment of the document based on the embedded instructions;
determine phrases of interest in the at least a text segment based on a reference and logged information specific to the user, wherein the reference includes a plurality of phrases and associations between the plurality of phrases;
indicate the phrases of interest in a response to the user device;
transmit the response to the user device, wherein the response enables the user device to display the document, visually distinguish the phrases of interest indicated in the response from the remaining text within the document that conveys to a user a capability of user input corresponding to the phrases of interest, the response also includes search results for the phrases of interest from a plurality of data sources, wherein the searches were performed prior to the response to the user device, and
in response to user input corresponding to a phrase of interest within the document, display at least a portion of the search results corresponding to the phrase of interest concurrently with the document, wherein the phrase of interest and the at least portion of the search results are viewable simultaneously.

16. The apparatus of claim 15, wherein the server is further configured to:
retrieve respective search results associated with each phrase of interest from a cache; and
include the respective search results in the response.

* * * * *